United States Patent [19]

Laurenz

[11] 4,248,406
[45] Feb. 3, 1981

[54] BARN SCRAPER DRIVE ASSEMBLY

[75] Inventor: Frank R. Laurenz, Eagle Butte, S. Dak.

[73] Assignee: Agricultural Research & Development, Inc., Eagle Butte, S. Dak.

[21] Appl. No.: 26,209

[22] Filed: Apr. 2, 1979

[51] Int. Cl.³ .............................................. C02F 5/02
[52] U.S. Cl. ................................... 254/274; 318/286
[58] Field of Search ............. 254/175.5, 175.7, 173 R, 254/147

[56] References Cited

U.S. PATENT DOCUMENTS

| | | | |
|---|---|---|---|
| 2,675,991 | 4/1954 | Waterstreet | 254/147 X |
| 2,709,068 | 5/1955 | Waterstreet | 254/147 X |
| 2,813,434 | 11/1957 | Stuebs | 254/173 R |
| 3,318,576 | 5/1967 | Kitson | 254/175.5 |

Primary Examiner—Edward J. McCarthy
Attorney, Agent, or Firm—Larson, Taylor and Hinds

[57] ABSTRACT

The drive motor is pivotally supported axially within the frame so that it rotates slightly if the torque of the motor increases due to the scraper assembly being impeded by animals, equipment, broken slats or the like. This actuates a reversing switch thus reversing the movement of the scraper assembly. If desired, an electric shock circuit can be included which is actuated first, in case the obstruction is an animal. If the animal moves away from the scraper then the scraper proceeds as the reversing switch has not been actuated at this time.

14 Claims, 4 Drawing Figures

BARN SCRAPER DRIVE ASSEMBLY

BACKGROUND OF THE INVENTION

This invention relates to new and useful improvements in drive assemblies for equipment such as barn scrapers and the like.

Conventionally such devices are moved along the barn or stable floor and operate automatically to clear the manure, debris and the like from the floor at predetermined intervals. One of the difficulties of such a device is controlling same if an obstruction is encountered. If the obstruction is in the form of equipment, or a broken slat or divider or the like then, of course, damage can occur to the equipment unless the equipment can be reversed or stopped.

By the same token, if it is an animal that is impeding the progress of the equipment then unless the equipment is stopped or reversed, the animal may be severely injured.

Existing equipment is not satisfactory because of the complexity thereof which is easily damaged and requires constant adjustment.

SUMMARY OF THE INVENTION

The present invention overcomes disadvantages of existing equipment and one aspect of the invention consists of a drive assembly for equipment such as barn scrapers and the like which include supporting framework, and electric motor mounted in said framework and drive means operatively connecting said motor to said equipment; comprising in combination means to mount said motor in said framework for partial rotation substantially axially of said motor and responsive to an increase in torque of said motor, adjustable means extending between said motor and said framework to adjust the torque required to rotate said motor a predetermined amount, electrical switch means mounted in said framework to control the operating characteristics of said motor and means operatively extending from said motor to said switch means to actuate said switch means if the torque of said motor exceeds a predetermined amount.

Another advantage of the present invention is that, if desired, intermediate switches may be provided which initiate current to an electrode which will shock an animal, if an animal is the obstructing medium, thus causing the animal to move before the equipment is stopped or reversed. In other words the equipment is only stopped or reversed if an obstruction such as other equipment, broken slats or the like intervenes.

A yet further advantage of the invention is to provide a device of the character herewithin described which is readily incorporated in existing drive assemblies for equipment such as barn scrapers or the like.

A still further advantage of the present invention is to provide a device of the character herewithin described which is simple in construction, economical in manufacture, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which :

DESCRIPTION OF THE DRAWINGS

FIG. 1 is a top plan view of the drive assembly for a barn scraper or the like.

In the drawings like characters of reference indicate corresponding parts in the different figures.

DETAILED DESCRIPTION

Proceeding therefore to describe the invention in detail, the drive assembly is preferably enclosed within supporting framework collectively designated 10 in which an enclosure is formed by channel or angle iron members welded or otherwise secured together and enclosed by a cover assembly (not illustrated) for protection purposes.

Figure 1:
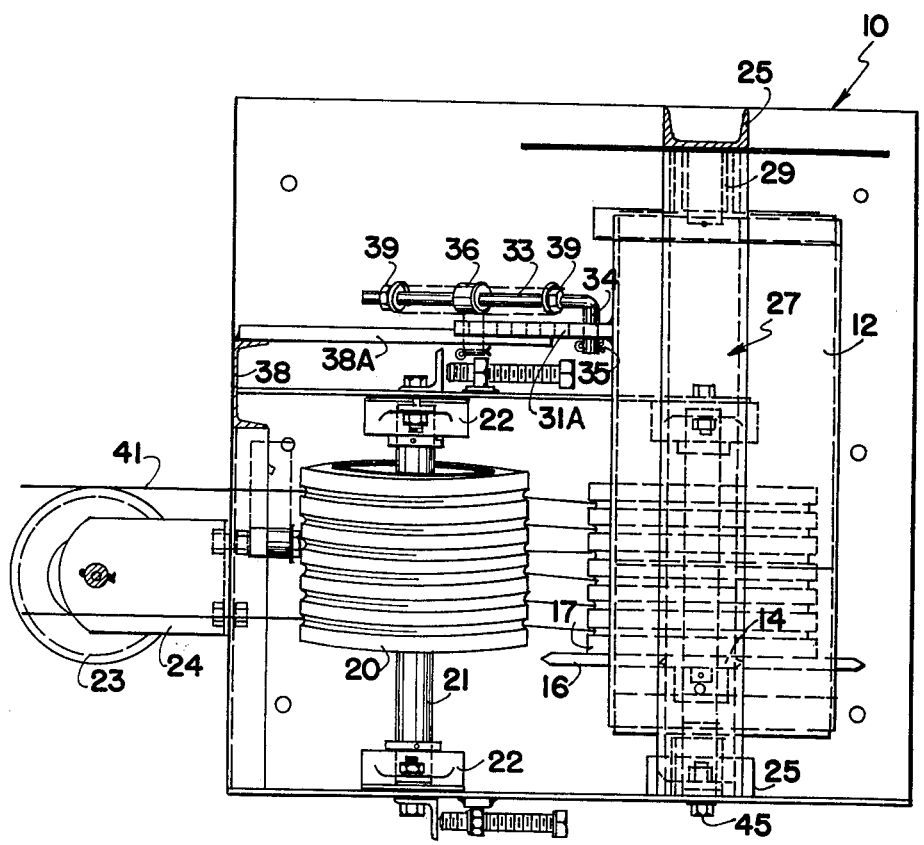
Figure 2:
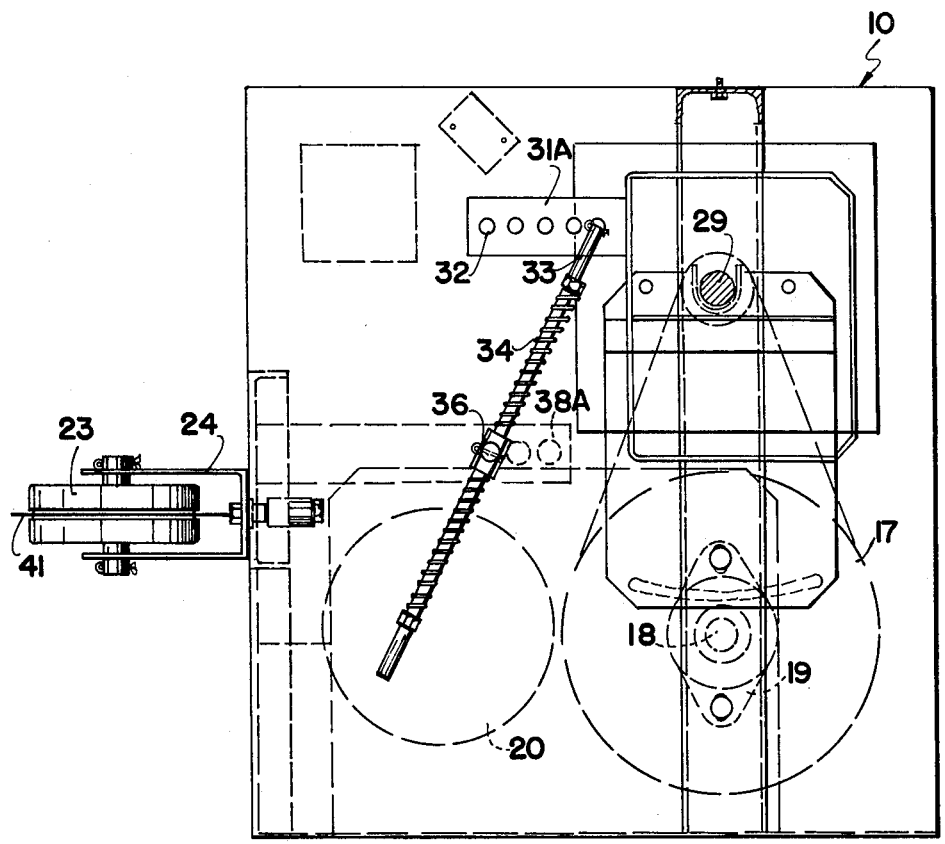
FIG. 2 is a side elevation of FIG. 1.
Figure 3:
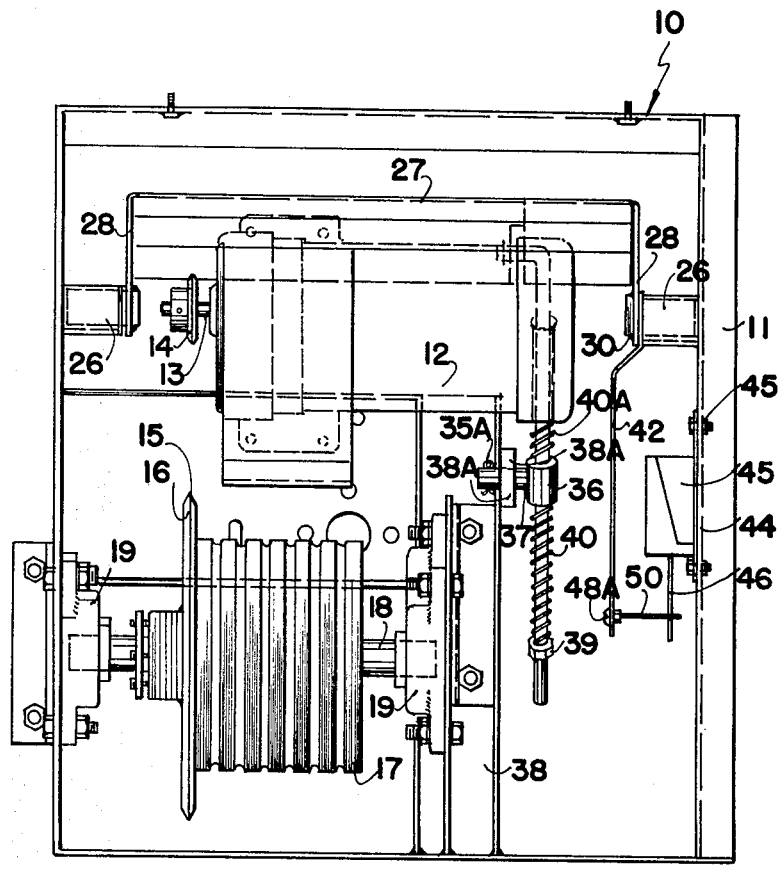
FIG. 3 is a rear elevational view of FIG. 1.

A source of power in the form of an electric motor 12 is provided, operatively connected to a source of electrical energy (not illustrated) and this motor includes a drive 13 driving a chain sprocket 14. A chain shown schematically at 15 in FIG. 3, extends around this sprocket and around a larger sprocket 16 which is secured to a multi-grooved drive pulley 17 mounted upon a shaft 18 supported within bearings 19 secured to the supporting framework.

A cable sheave idler pulley 20 is also mounted for rotation upon a shaft 21 supported in bearings 22, supported within the framework.

An offstanding single groove idler pulley 23 is journalled for rotation within a bracket 24 externally of the framework and an endless cable is guided by this idler pulley and around the pulley sheaves 20 and 17.

Means are provided to support the motor 12 within the framework and in this connection a pair of vertical channel members 25 are provided one upon each side of the supporting framework and saddle supports 26 are secured to these channel members 25 spaced downwardly from the upper side of the supporting framework.

A mounting plate collectively designed 27 is secured longitudinally across the top of the motor casing either by bolts or welding (not illustrated) and extends beyond each end plate of the motor and terminates in downwardly extending end portions 28. Stub shafts 29 extend outwardly from the downwardly extending portions 28 to which they are welded as illustrated by reference character 30 and bearing bushings 31 surround the stub shafts and engage the saddle supports 26 so that the motor is journalled for partial rotation within the saddle supports. It is desirable that the axes of the stub shafts 29 are in alignment with the longitudinal axis of the drive shaft 13 so that the motor rotates in effect around the longitudinal axis of the drive shaft 13.

Means are provided extending between the motor casing and the supporting framework to control and restrict the rotation of the motor casing, said means taking the form of an offstanding bracket 31A secured to the casing and extending outwardly therefrom and being provided with a plurality of apertures 32.

A torque rod 33 is angulated at the upper end to form a part 34 perpendicular to the axis of the main rod 33 and this part 34 pivotally engages any one of the apertures 32 and is held in place by means of a split pin or cotter pin 35 extending through the end on the other side of the bracket 31A.

A bearing sleeve 36 is provided with a mounting pin 37 which pivotally engages through an aperture formed in a support channel 38 extending upwardly from the base of the supporting framework and torque rod 33 slideably engages this bearing sleeve 36. The offstanding mounting portion 37 of the bearing sleeve is prevented from disengagement by means of a further cotter pin or split pin 35A extending therethrough on the portion on the other side of the support bar 38A which extends from the aforementioned channel 38.

The torque rod 33 is screw threaded and engaged by adjustment nuts 39 one upon either side of sleeve 36 and spaced therefrom and compression springs 40 and 40A surround the torque rod 33 and react one between the sleeve and the nut 39 on the distal end of the torque rod and the other between the sleeve and the nut on the end adjacent the part 34 of the rod and adjustment of these nuts 39 controls the compression characteristics of the springs. These springs restrict the rotary movement of the motor casing to a greater or lesser extent depending upon design parameters.

In operation, to this point, the motor drives the endless cable 41 which is connected to the equipment (not illustrated) and this drive requires a certain torque in order to operate the equipment. The nuts 39 are adjusted so that the springs 40 and 40A balance the normal torque exerted by the motor so that in effect, the motor is stationary and is not rotating. However, if an obstruction of any form is reached by the equipment secured to cable 41 then this increase in torque is transmitted to the motor due to the drive chain 15 thus rotating the motor casing slightly due to torque reaction against pressure of either spring 40 or 40A depending upon the direction of rotation of the motor. In this regard it should be noted that under normal conditions, equipment such as barn scrapers move from one end of the barn to the other whereupon the motor reverses and brings the barn scraper back to the other end whereupon it again reverses.

Figure 4:
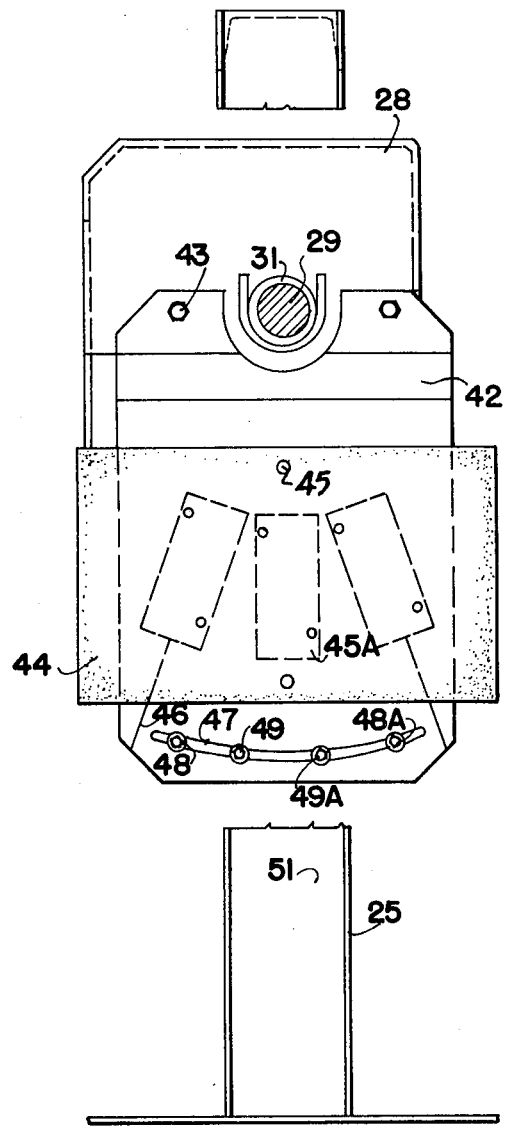
FIG. 4 is an enlarged side elevation of the switching arrangement per se.

If an obstruction is reached, it is desirable either to stop the motor or to reverse same and in this connection reference should be made to FIG. 4.

A substantially rectangular switch operating plate 42 is secured as by bolts 43 to the downwardly extending portion 28 on one side of the mounting plate 27 and extends downwardly therefrom below the stub shaft 29 as clearly illustrated. A substantially rectangular switch mounting plate 44 is secured as by bolts 45 or the like, to one of the vertical channel members 25 forming part of the supporting framework and a plurality of conventional limit switches 45A are secured on the inner surface of this plate and are situated in arcuate array. Each of these limit switches is provided with an actuating finger 46 depending downwardly therefrom.

An arcuate slot 47 is formed through adjacent the lower end of the switch actuating plate 42 and a plurality of switch actuators 48, 48A, 49 and 49A are adjustably mounted within this arcuate slot and include a shank 50 extending towards the resilient fingers 46 of the switches 45.

Switches 48 and 48A are mounted one upon each side of the vertical axis 51 of the mounting which passes through the stub axles 29. If an obstruction is engaged by the equipment, during operation thereof, then the motor will rock or partially rotate around the stub axles axis thus moving the switch actuating plate 28 together with the switch actuator shanks 50. Depending upon the adjustment of the compression springs 40 or 40A, the shank 50 will actuate the finger 46 of either of the extreme switches 45 thus changing the direction characteristics of the motor 12. In other words, if the motor is going forwardly or in one direction, then the actuator 48 will strike the finger of the relevant switch thus reversing the rotation of motor 12 so that the equipment reverses its direction. If, however, the motor is in the reverse position already then actuator 48A will trip the relevant switch thus causing the direction of travel of the motor to change to the forward position and changing the direction of movement of the equipment.

Alternatively, of course, the switches actuated by actuators 48 and 48A can be wired to switch off the equipment completely.

If desired, actuators 49 and 49A can be included inboard of the actuators 48 and 48A and adapted to actuate a middle switch 45A which can be wired to an electrode on the equipment and designed to activate the electrode to provide an electric shock. This particular mode is suitable for use when it is an animal which causes the obstruction. In an automatic piece of equipment such as a barn cleaner, animals often interfere with the action thereof and in order to avoid switching off the equipment or reversing same, the electrode is actuated thus shocking the animal and causing same to move. Once the animal has moved, the torque reduces thus de-activating the electrode and permitting the equipment to proceed in the same direction as heretofor.

All of the actuators 48, 48A, 49 and 49A are adjustable within the arcuate slot 47 for setting purposes.

Although springs 40 and 49A are used to react against increased torque of the motor 12, nevertheless resilient bushings or other forms of adjustable resistance can be provided.

From the foregoing it will be appreciated that any increase in the tension of cable 41 due to the equipment driven thereby, engaging an obstruction, causes the torque to increase on the motor 12 and the torque reaction partially rotates the motor casing depending upon the direction of travel of the drive shaft 13 thereof thus actuating the relevant switches 45 to either stop or reverse the movement of the equipment or, alternatively, to provide an electric shock prior to the reversing or de-activating switches being reached.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A drive assembly for equipment such as barn scrapers and the like which include supporting framework, an electric motor mounted in said framework and drive means operatively connecting said motor to said equipment; comprising in combination means to mount said motor in said framework for partial rotation substantially axially of said motor and responsive to an increase in torque of said motor, adjustable means extending between said motor and said framework to adjust the torque required to rotate said motor a predetermined amount, electrical switch means mounted in said framework to control the operating characteristics of said motor and means operatively extending from said motor to said switch means to actuate said switch means if the torque of said motor exceeds a predetermined amount.

2. The assembly according to claim 1 in which said means mounting said motor to said framework includes a mounting plate secured to said motor, a stub shaft secured to and extending from said mounting plate at each end of said motor and substantially axially with the drive shaft of said motor, bushing means bearingly mounting said stub shafts and means mounting said bushing means to said supporting framework.

3. The assembly according to claim 1 in which said adjustable means extending between said motor and said framework includes a bracket secured to said motor and offstanding therefrom substantially perpendicularly to said longitudinal axis, a bearing sleeve secured to said framework, a torque reactor rod operatively extending from said bracket and slidably engaging said sleeve, and adjustable spring means on said rod operatively reacting between said rod and said sleeve.

4. The assembly according to claim 2 in which said adjustable means extending between said motor and said framework includes a bracket secured to said motor and offstanding therefrom substantially perpendicularly to said longitudinal axis, a bearing sleeve secured to said framework, a torque reactor rod operatively extending from said bracket and slidably engaging said sleeve, and adjustable spring means on said rod operatively reacting between said rod and said sleeve.

5. The assembly according to claim 3 in which said torque rod is pivotally secured by one end thereof to said bracket in any one of a plurality of positions, said rod being screw threaded on either side of said sleeve, adjustment nuts screw threadably engaging said rod upon either side of said sleeve, and compression springs reacting between each of said adjustment nuts and said sleeve, said adjustment nuts adjusting the effective pressure exerted by said springs against rotary movement of said motor.

6. The assembly according to claim 4 in which said torque rod is pivotally secured by one end thereof to said bracket in any one of a plurality of positions, said rod being screw threaded on either side of said sleeve, adjustment nuts screw threadably engaging said rod upon either side of said sleeve, and compression springs reacting between each of said adjustment nuts and said sleeve, said adjustment nuts adjusting the effective pressure exerted by said springs against rotary movement of said motor.

7. The assembly according to claim 1 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

8. The assembly according to claim 2 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

9. The assembly according to claim 3 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

10. The assembly according to claim 4 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

11. The assembly according to claim 5 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

12. The assembly according to claim 6 in which said means operatively extending from said switch means to said motor includes an operating component operatively secured to said motor and movable therewith, switch support means secured to said framework, at least one switch mounted on said switch support means, and means operatively extending from said component engageable with said switch to actuate same, said switch being operatively connected to said motor, the actuation of said switch altering the characteristics of said motor when the torque of said motor exceeds a predetermined amount when operating in one direction.

13. The assembly according to claims 7, 8 or 9 which includes a switch on each side of said component whereby the operating characteristics of said motor are altered when said motor is running in either direction.

14. The assembly according to claims 10, 11 or 12 which includes a switch on each side of said component whereby the operating characteristics of said motor are altered when said motor is running in either direction.

* * * * *